United States Patent [19]
Caterino et al.

[11] Patent Number: 5,701,525
[45] Date of Patent: Dec. 23, 1997

[54] CAMERA ENCODER ASSEMBLY, SYSTEM AND METHOD THEREOF

[75] Inventors: Garret J. Caterino, Maynard; Patrick W. Hopkins, Chelmsford; Elliott S. Strizhak, Millis, all of Mass.

[73] Assignee: Polaroid Corporation, Cambridge, Mass.

[21] Appl. No.: 758,338

[22] Filed: Dec. 3, 1996

Related U.S. Application Data

[63] Continuation-in-part of Ser. No. 576,777, Dec. 21, 1995.

[51] Int. Cl.$^6$ ............ G03B 9/08; G03B 13/34; G01D 5/36
[52] U.S. Cl. .......... 396/132; 396/133; 396/235; 396/463; 396/490; 250/231.16; 250/237 G
[58] Field of Search .......... 396/132, 133, 396/463, 490, 235, 240; 250/231.14, 231.15, 231.16, 237 G; 341/13, 14; 359/209, 233, 234

[56] References Cited

U.S. PATENT DOCUMENTS

| | | |
|---|---|---|
| 4,192,587 | 3/1980 | LaRocque et al. . |
| 4,199,244 | 4/1980 | Shenk . |
| 4,278,340 | 7/1981 | Toyama . |
| 4,325,614 | 4/1982 | Grimes . |
| 4,354,748 | 10/1982 | Grimes et al. . |
| 4,426,145 | 1/1984 | Hashimoto . |
| 4,427,276 | 1/1984 | Feinerman et al. . |
| 4,445,762 | 5/1984 | Boccuti ............ 396/235 |
| 4,464,040 | 8/1984 | Okura et al. ......... 354/455 |
| 4,505,567 | 3/1985 | Hirohata et al. . |
| 4,610,523 | 9/1986 | Tsuboi . |
| 4,696,559 | 9/1987 | Kondo . |
| 4,799,077 | 1/1989 | Kaplan et al. . |
| 4,833,316 | 5/1989 | Yoneda ............ 250/237 G |
| 4,835,564 | 5/1989 | Nakagawa et al. ....... 396/235 |
| 4,851,870 | 7/1989 | Tanaka et al. ......... 396/235 |
| 4,983,825 | 1/1991 | Ichikawa et al. ...... 250/231.16 |
| 5,014,082 | 5/1991 | Farrington ........... 396/235 |
| 5,032,859 | 7/1991 | Akimoto et al. . |
| 5,126,560 | 6/1992 | Kraus ........... 250/231.14 X |
| 5,177,523 | 1/1993 | Huang et al. . |
| 5,294,793 | 3/1994 | Schwaiger et al. ..... 250/231.16 |
| 5,365,301 | 11/1994 | Sugita et al. . |
| 5,414,516 | 5/1995 | Morishita et al. ..... 250/231.16 X |
| 5,604,345 | 2/1997 | Matsuura ............ 250/237 G |

*Primary Examiner*—W. B. Perkey
*Attorney, Agent, or Firm*—Leslie Payne

[57] ABSTRACT

A camera shutter and focus encoder assembly comprises an encoder mask fixed in a camera housing and having an arcuate window having alternating opaque and transmissive portions, and an encoder sheet mounted in the housing in abutting relationship with the encoder mask, the encoder sheet being movable with exposure blades and the focus lens of the camera and having an arcuate window having alternating opaque and transmissive portions therein. Means are provided for pressing the encoder mask and the encoder sheet together with the mask and sheet windows in registration with each other. A sensor passes pulses of light through the mask and sheet windows when the transmissive portions thereof are in registration and detects the pulses of light, converts the light pulses to electrical signals, and transmits the electrical signals. A controller receives the electrical signals and determines therefrom the position and direction of movement of the shutter blades, compares the blade position and movement direction with a preselected program and sends to a motor a signal instructing any required compensating shutter blade movement change, and in like manner monitors the focus assembly and sends to the motor a signal instructing any required compensating lens movement change.

16 Claims, 14 Drawing Sheets

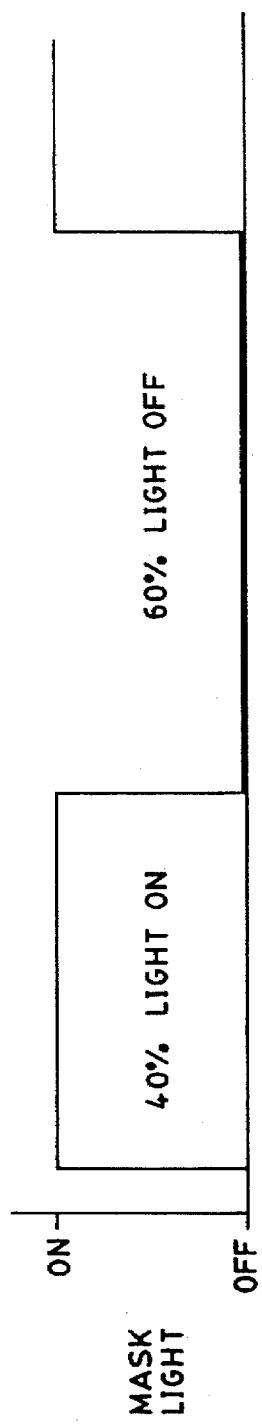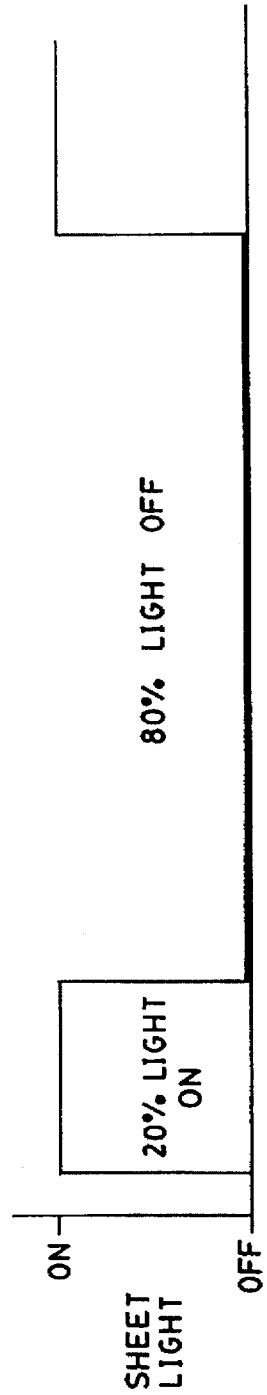

CAMERA ENCODER ASSEMBLY, SYSTEM AND METHOD THEREOF

CROSS-REFERENCE TO RELATED APPLICATION

This is continuation-in-part application that is related to commonly assigned and copending U.S. patent application Ser. No. 08/576,777, filed Dec. 21, 1995, in the name of Patrick W. Hopkins, et al.

BACKGROUND OF THE INVENTION

This invention relates generally to encoding assemblies and systems and, more particularly, to encoding assemblies and systems for controlling camera functions including those involving shutter elements and/or focus lens carriers in accordance with selected programs.

In camera systems, an encoder senses the position of a shutter blade member throughout the exposure interval. Because both of two shutter blades, or all of a multiplicity of shutter blades, are mounted for simultaneous movement, only one blade has to be monitored to register the disposition of all blades of a blade mechanism. In one type of camera encoder system there is provided an array of slits disposed in a blade member, light emitting diode means (LEDs) positioned behind the slits, and photocells positioned in front of the slits. In response to movement of the blade member, the slits and intervening light blocking segments sequentially unblock and block transmission of light from the LEDs to the photocells, to thereby produce digitally encoded output signals therefrom.

The outputs from the photocells are fed to a network, typically including a microcontroller, for decoding direction and blade displacement information. The controller compares the information from the photocells with the trajectory selected by the operator. If there is correlation, indicating that the blade member is following the selected trajectory, the controller continues to supply the original trajectory signal program to the stepper motor. However, if the signal comparison indicates that the monitored blade member is either ahead of, or is lagging behind, the correct position, the controller automatically. provides a corrective signal to the stepper motor. The corrective signal operates to accelerate or decelerate the stepper motor to move the blade mechanism toward the correct position. Such corrective action continues until the encoder indicates that the blade mechanism is at the correct position to generate the selected trajectory, at which point the controller automatically switches back to the follow trajectory mode. Encoder mechanisms are a critical component of the camera inasmuch as the encoder continuously monitors and initiates correction of the positions of the blade mechanism to provide a correct exposure trajectory.

In the aforenoted U.S. patent application Ser. No. 08/576,777, which is incorporated hereinby reference to be made: as a part hereof, there is shown and described a camera shutter and focus lens assembly under the control of an encoding system. Included in this encoder assembly is an encoder mask and an encoder sheet. Both are positioned adjacent each other and having arcuate windows in registration with each other. The windows are provided with alternating light blocking and light unblocking transmissive areas. In operation, the encoder sheet moves rotatably proportionally with the movement of the shutter blades and with the movement of a focus lens carrier, while the mask remains stationary. Thus, the sheet and mask windows move relative to each other during shutter blade movement and during focus lens carrier movement. A sensor reads light passing through the unblocking portions of the windows and determines the positions of the shutter blades and the direction in which the shutter blades are moving, as well as the position and the direction of movement of the focus lens carrier. The sensor sends a signal to a microcontroller which determines the position and direction of movement of the shutter blades for comparing such positioning and direction of movement with preselected programs for signaling a motor to change the movements of the shutter blades, if the comparison reveals a difference. The sensor similarly determines the position of the focus lens carrier and compares the focus lens carrier position with a preselected program and signals the motor to change the position of the focus lens carrier, if the comparison reveals a difference.

While this encoding scheme performs well in controlling the shutter, there is a desire to enhance the performance thereof. In this regard, it has been determined that the presence of light between the encoder mask and sheet scatters and as a result provides false information to light detectors in the sensor. Accordingly, this leads to inaccurate conclusions on the part of the microcontroller and consequently erroneous signals being sent to the motor for modifying blade position. Hence, there is a desire to minimize errors caused by such light scattering.

In addition, there is a desire to enhance the sensitivity of encoder systems of the last noted; wherein there is provided an encoder mask and sheet with alternating light blocking and light unblocking areas which are of about equal area. Thus, an encoding sheet having 50% light unblocking and 50% light blocking areas, passes over an encoding mask having about 50% light blocking areas and 50% light unblocking areas. That is, each of the encoding masks and sheets have alternating light blocking and unblocking areas of about equal size. In this arrangement when an encoder sheet unblocking portion comes into alignment with an encoder mask unblocking portion, the light sensors detect an ever-increasing light aperture until the mask unblocking portion is in complete registration with the sheet transmissive portion, at which time a maximum aperture is provided for an instant before the aperture begins to decrease. Thus, the light sensors detect maximum light for only an instant and send a very brief maximum electrical signal to the microcontroller, which in that very brief time period compares the sensed positions and direction of movement of the shutter blades with a preselected program and, if necessary, signals the motor to change the position of the blades and/or the blade direction of movement. The fact that the encoder mask and encoder sheet provide only a brief instant of maximum light aperture requires a very sensitive, and therefore expensive and sophisticated, arrangement of high speed sensors and controller. Accordingly, there is a desire to utilize less sensitive sensors.

SUMMARY OF THE INVENTION

According to the present invention, provision is made for an improved encoder assembly comprising: encoding mask means coupled to one of a pair of relatively movable members for providing alternating light blocking and unblocking portions. Included is encoding sheet means coupled to a second one of the pair of relatively movable members for providing alternating light blocking and unblocking portions. Provision is made for means for urging the light blocking and unblocking means of the encoding mask and sheet means together into intimate abutting relationship with one another such scattering of light therebetween during relative movement of the movable members is significantly minimized or eliminated.

In an illustrated embodiment there is provided means for urging said masking and sheet means together comprises biasing means.

In another illustrated embodiment, provision is made for having the masking means with an emulsion side and the sheet means is provided with an emulsion side, whereby the emulsion sides are in mutual facing relationship with each other; such that the urging means operates to urge the emulsion sides into intimate abutting relationship together.

In still another illustrated embodiment, provision is made for each area of the unblocking means of the sheet means differing in area from each respective area of the unblocking means of the mask means to provide for increased intervals at which a maximum amount of beam light is transmitted through the unblocking portions and is readby sensing means.

In yet another embodiment, provision is made for each of the blocking portions of the mask means having generally equal areas with respect to each other; and each of the unblocking areas of the mask means is of generally equal area; and, the combined areas of the blocking portions of the mask means is asymmetrical with respect to the combined areas of the unblocking portions.

In still yet another illustrated embodiment, provision is made for each one of the blocking portions of the sheet means being of generally equal area with respect to each other; each of the unblocking areas of the sheet means is of generally equal area to each other; and, the combined areas of the unblocking portions of the sheet means is asymmetrical with respect to the combined areas of the blocking portions.

Still according to another illustrated embodiment provision is made for an encoding mask means coupled to one of a pair of relatively movable members for providing alternating light blocking and unblocking portions. Included is encoding sheet means coupled to a second one of the pair of relatively movable members for providing alternating light blocking and unblocking portions. A sensor means is present for passing pulses of light through the unblocking portions of the masking and sheet means from a first side when the unblocking portions are in registration with each other; and for detecting the pulses of passed light on a second side of the masking and sheet means, and for converting the passed light pulses to electrical signals, and for transmitting the electrical signals; each area of the unblocking means of the sheet means is asymmetrical in area from each area of the unblocking means of the mask means as the unblocking means of the sheet means moves relative to the unblocking means of the mask means so as to provide for increased intervals at which the maximum amount of beam light is transmitted through the unblocking portions and is read by sensing means.

Accordingly, an object of the invention is to provide an encoder assembly having means for substantially minimizing or excluding light from scattering between the encoder mask and the encoder sheet.

A further object of the invention is to provide an encoder assembly in which window portions of the encoder mask and the encoder sheet are provided with alternating light unblocking and blocking areas which are sized and arranged such that alignment of portions of the respective windows provides for increased intervals at which the maximum amount of beam light is transmitted through the unblocking portions and is read by the light sensors; such that it sends corresponding electrical signals representative of maximum input to the controller, which is thereby provided with longer lasting time in which to assess the correctness of the blade positions and direction of movement and in which to send corrective signals to the controller.

A still further object of the invention is to provide an encoder assembly which is relatively inexpensive and therefore practical for lesser priced cameras, while providing necessary sensitivity to signals from the sensor.

With the above and other objects in view, as will hereinafter appear, a feature of the present invention is the provision of an improved encoder assembly for a camera; whereby for instance the shutter and focus assembly can be better controlled.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIGS. 15A–15D are diagrammatic illustrations of the electrical signals sent by the interrupter to the controller.

DETAILED DESCRIPTION

Figure 1A:
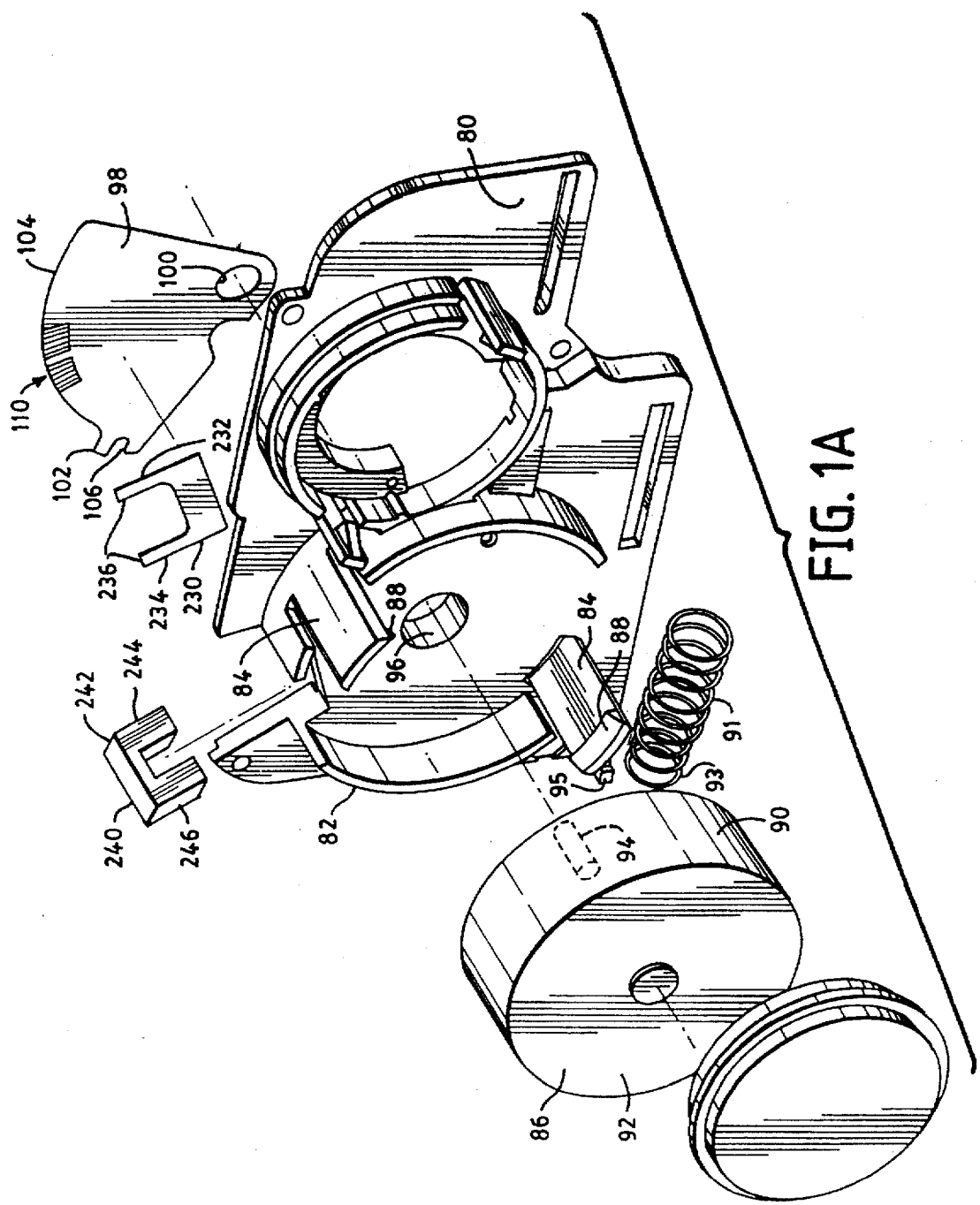
FIGS. 1A–1C are exploded views of a camera shutter and focus lens assembly, including portions of an encoder assembly illustrative of an embodiment of the invention.
Figure 1B:
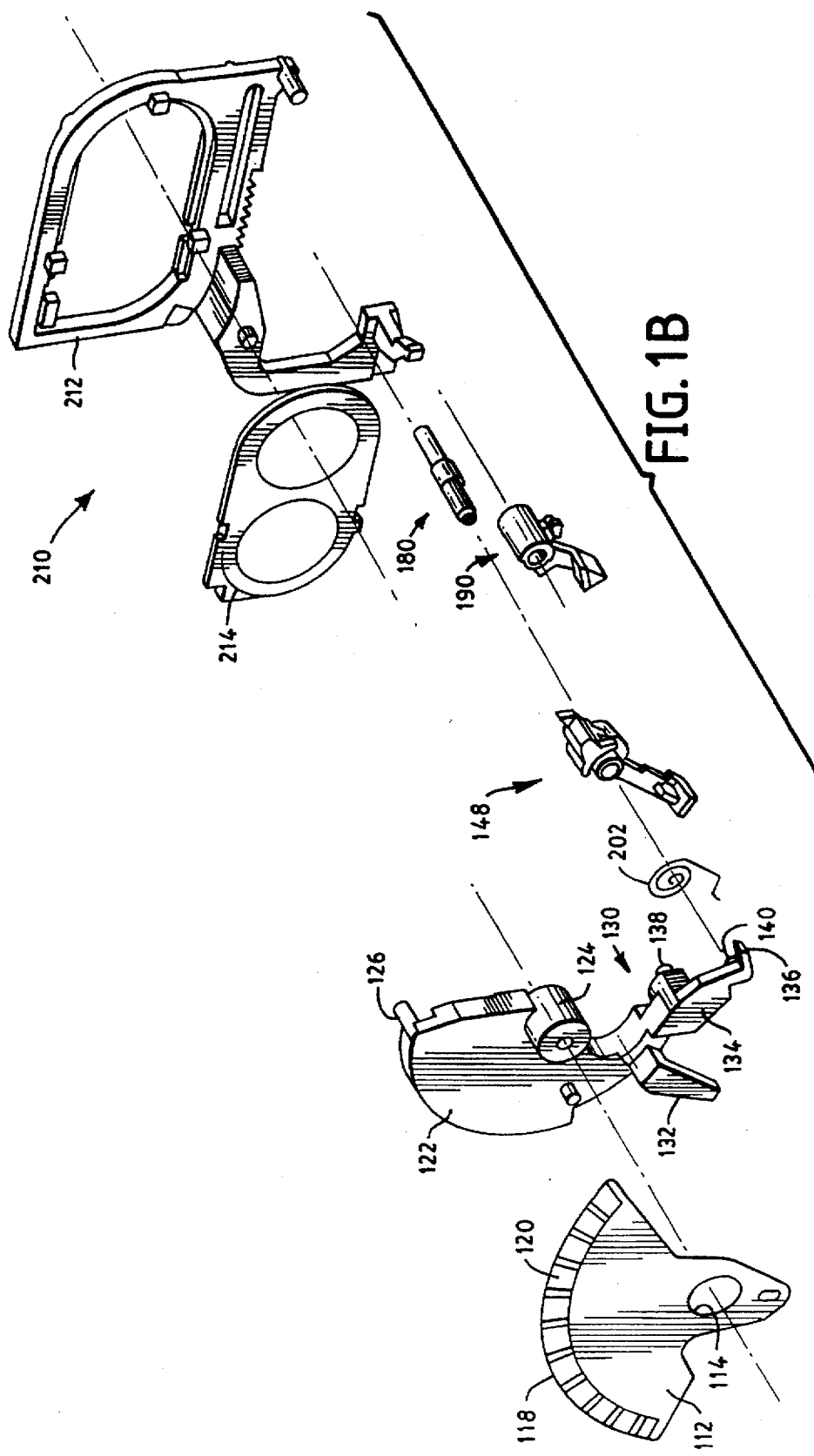
Figure 1C:
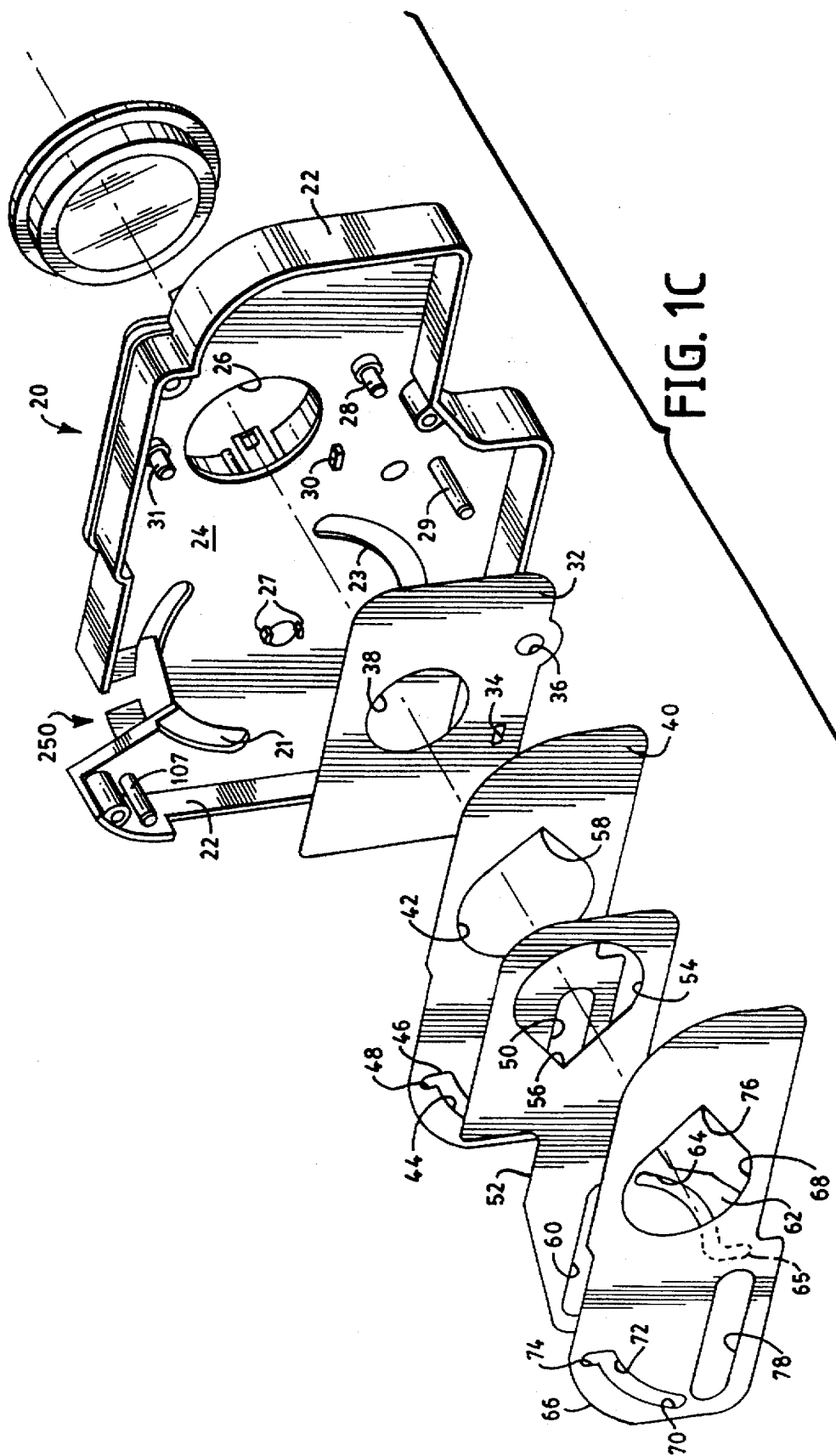

Referring to FIGS. 1A–1C, there is illustrated a camera shutter and focus assembly of the type in which the present encoder assembly finds utility. Although the encoder assembly is a preferred embodiment of the application of the principles of the present invention, it will be understood that the encoder assembly can be used in other applications. Included is a housing 20 (FIG. 1C) substantially bounded by a side wall 22 upstanding from a rear wall surface 24. The housing 20 is provided with an opening 26 therein, pins 28 and 31 extending forwardly from the rear surface 24, a projection 30 extending forwardly from the rear surface 24, and a pair of arcuate blind grooves 21, 23. The housing 20 is further provided with a pair of locating tabs 27 and a pin 29 extending forwardly from the rear surface 24. An optical stop plate 32 is fixed to the rear surface 24 of housing 20, the stop plate 32 having a rectangular opening 34 therein adapted to snugly receive the projection 30, and an orifice 36 therein adapted to receive the pin 28. The optical stop plate 32 includes an aperture 38 aligned with the housing opening 26.

A shutter opening blade 40 is disposed adjacent to the optical stop plate 32 and has therein a first tear-shaped orifice 42 and a curved groove 44 which, at an upper end 46 thereof, joins a generally vertical groove 48. The shutter opening blade 40 further includes a straight closed-end horizontal groove 50 which rides on the locating tabs 27 of the housing 20.

Adjacent the shutter opening blade 40 is a right shutter opening blade 52 having therein a second tear-shaped orifice 54 with a point 56 of the orifice 54 facing leftwardly, as viewed in FIG. 1C, opposite to a point 58 of the first tear-shaped orifice 42 of the shutter opening blade 40. The right shutter opening blade 52 is provided with a straight closed-end horizontal groove 60, which rides on the locating tabs 27 of the housing 20. The right shutter opening blade 52 is further provided with a depending flange portion 62 having therein a closed-end curved groove 64 which, at a lower end thereof, joins a generally vertical groove 65.

Next to the right shutter opening blade 52 is a left shutter opening blade 66 having therein a third tear-shaped orifice 68 and a curved groove 70 which, at an upper end 72 thereof, joins a generally vertical groove 74. A point 76 of the orifice 68 faces rightwardly, as viewed in FIG. 1C, similarly to the orifice 42 and oppositely to the orifice 54. The left shutter opening blade 66 is provided with a straight closed-end horizontal groove 78, which rides on the locating tabs 27 of the housing 20. Right ends of the blades 40, 52 and 66, as viewed in FIG. 1C, are captured between circumferential portions of pins 28 and 31, such that orifices 42, 54 and 68 are properly aligned.

Figure 2:
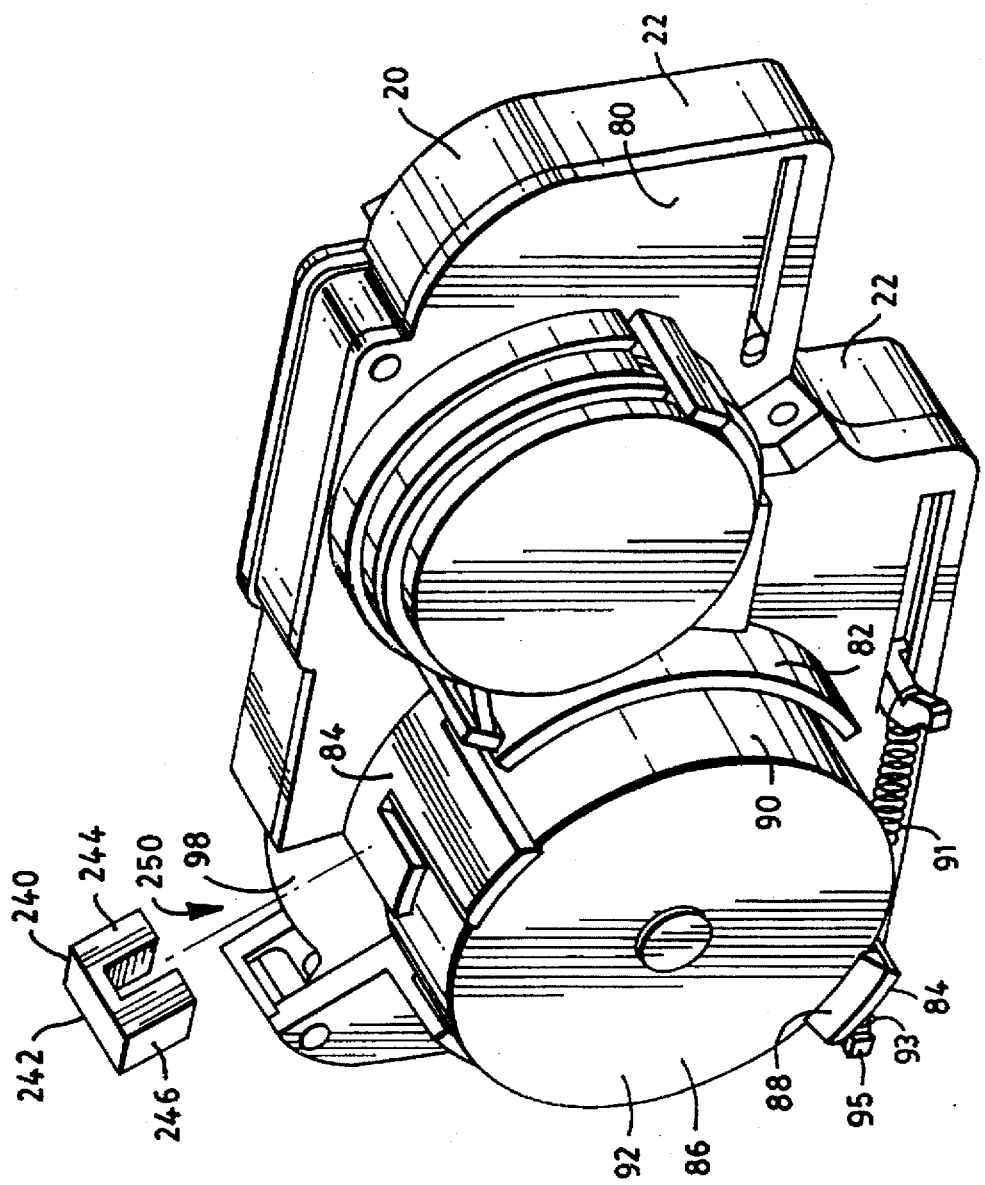
FIG. 2 is a generally frontal perspective view of the camera shutter and focus lens assembly of FIGS. 1A–1C, including portions of the illustrative encoder assembly.

Referring to FIG. 1A, it will be seen that the assembly includes a front plate 80 having thereon an upstanding circular wall 82 and a pair of leaf springs 84 adapted to receive and retain an electric motor 86. The motor 86 fits snugly within the wall 82. The leaf springs 84 are provided with inwardly-directed projections 88 which, in assembly, ride along a side wall 90 of the motor 86 and snap into place over a front face 92 of the motor 86 to lock the motor in place (FIG. 2). The motor 86 turns a central shaft 94 which is disposed in, and extends through, a hole 96 in the front plate 80. An extension spring 91 is connected at a first end 93 to a spring retainer 95 extending forwardly from the front plate 80.

Figure 3:
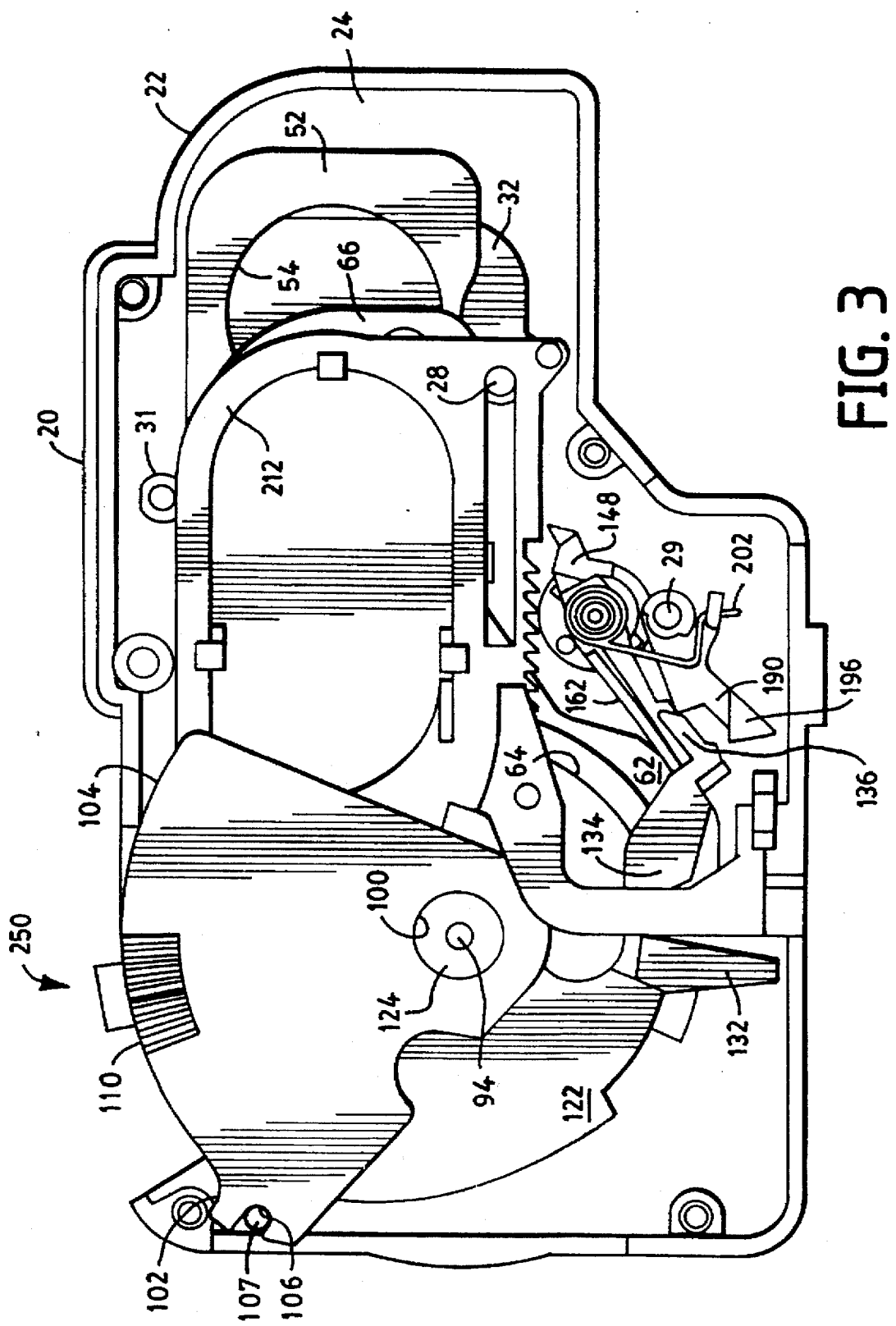
FIG. 3 is a front elevation view of the assembly of FIG. 2 with the front cover and motor removed.

Mounted concentrically on a hub portion 124 of a beam actuator 122 (FIGS. 1B and 3) is an encoder mask 98 (FIG. 1A) having therein a hole 100. A tab 102 extends outwardly from a curved periphery 104 and has therein an opening 106 by which the encoder mask 98 is fixed to the housing 20 by engagement with a pin 107 (FIG. 1C) extending forwardly from the surface 24. The encoder mask 98 is of a semi-rigid plastic sheet material which is opaque, as by photographic imaging, but which is provided witch an arcuate partly transmissive window 110 on the curved periphery 104 thereof which is made of alternating blocking and unblocking portions to a sensing light.

Mounted adjacent the encoder mask 98 (FIG. 1A), is an encoder sheet 112 (FIG. 1B) having therein a hole 114, by which the encoder sheet 112 is mounted on the hub portion 124. The encoder sheet 112 is of a semi-rigid plastic sheet material, and is provided with an arcuate window 118 having encoder markings 120 formed thereon, as by photographic imaging. The encoder mask 98 and sheet 112 will be further described hereinbelow.

Fixed to the motor shaft 94 and adjacent the encoder sheet 112 is the beam actuator 122, which includes the hub portion 124 in which is fixed the motor shaft 94. The hub portion 124 extends forwardly, and mounted thereon are the encoder sheet 112 and encoder mask 98. The beam actuator hub portion 124 extends into the front plate hole 96 and extends through the mask and sheet holes 100 and 114. A post 126 (FIG 1B) extends rearwardly from the beam actuator 122 and is disposed in the curved groove 70 (FIG. 1C) on the left shutter opening blade 66 and the curved groove 44 of the shutter opening blade 40, and rides in the blind groove 21 of the housing 20.

The beam actuator 122 includes a leg portion 130 having thereon a lug 132 extending forwardly and downwardly from the beam actuator 122, as shown in FIG. 1B, and a projection portion 134 having at a distal end thereof a flange 136 and having extending rearwardly therefrom a pivot pin 138 and a boss 140. The pivot pin 138 rides in the curved groove 64 of the right shutter opening blade 52 and in the blind groove 23 of the housing 20.

The components of the leg portion 130 operate in conjunction with a pawl and beam stop 148 (FIG. 1B), a pawl latch 190, a post assembly 180, and a spring 202 to operate a moving lens assembly 210, including a lens element portion 214 and a lens carrier portion 212, as well as the shutter opening blades 40, 52 and 66, to operate the shutter and focus lens assemblies of the camera, as is shown and described in the aforementioned patent application.

Figure 4:
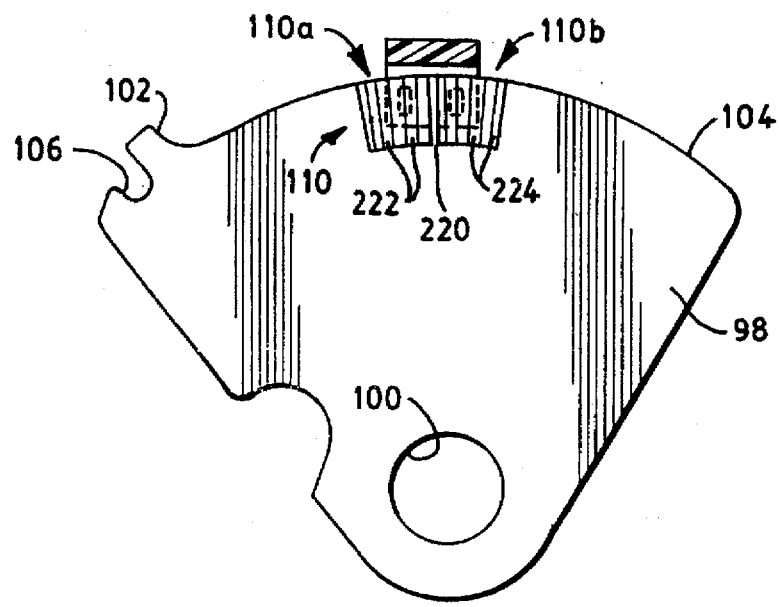
FIG. 4 is a front elevation view of a mask component of the encoder assembly, shown in conjunction with an interrupter.

Referring to FIG. 4, there is shown the encoder mask 98, which is non-moveable, and is concentric with the center axis of the beam actuator 122, the center axis of the motor 86, and the center axis of the encoder sheet 112. The encoder mask 98 preferably is provided with a radius of about 0.74 inch and is formed of 0.007 inch thick Mylar™. The window 110 is photographically imaged with a radial encoder pattern. The mask window 110 is provided with two sections, 110a, 110b, of imaged patterns, to provide two channels in the encoder. The sections 10a and 110b are separated by a center opaque band 220 and the two sections are imaged out of phase by 90°. Each section 110a, 10b, is imaged with alternating transmissive or light unblocking and opaque or light blocking radial portions, or bands 222, 224. In each of the window sections 110a, 110b, the transmissive bands 222 are of equal area and, in total, comprise 40% of the area of the section. The opaque bands 224 comprise 60% of the area of the section. A single transmissive band 222 and an adjacent opaque band 224 comprise a "duty cycle" which is 40% transmissive and 60% opaque. Each cycle preferably has a resolution of 0.347 degrees.

Figure 5:
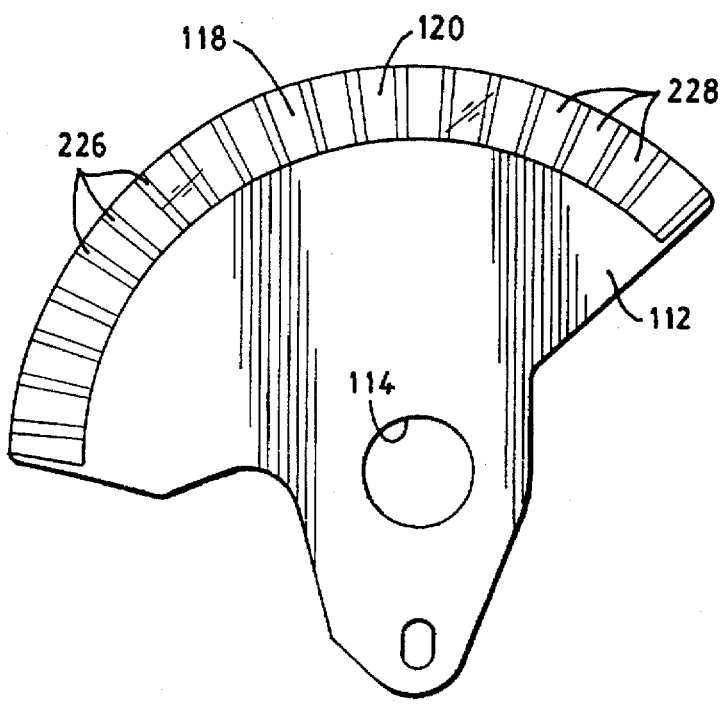
FIG. 5 is a front elevation view of a sheet component of the encoder assembly.

The encoder sheet 112 (FIG. 5) is fixed to the beam actuator 122, is concentric with the beam actuator center axis, the motor axis and the encoder mask axis, and rotates with the beam actuator 122 and motor 86. The encoder sheet 112 preferably is provided with a radius of about 0.74 inch, and is of 0.007 inch thick Mylar™. The encoder sheet window 118 is provided with the encoder markings 120 therein which comprise alternating transmissive or light unblocking and opaque or blocking radial bands 226, 228. The transmissive bands 226 are of equal area and, in total, comprise 20% of the area of the window. The opaque bands 228 comprise 80% of the area of the window. As in the encoder mask 98, a single transmissive band 226 and an adjacent opaque band 228 comprise a cycle which is 20% transmissive and 80% opaque. Each cycle preferably has a resolution of 0.347 degrees. As used throughout this application, the term light is meant to be inclusive of other electromagnetic frequencies that are used for encoding systems, such as infrared. The term transmissive or unblocking; and blocking or opaque are meant to be unblocking or blocking to the particular source of electromagnetic radiation being used (e.g., infrared or visible) for sensing purposes.

Figure 7:
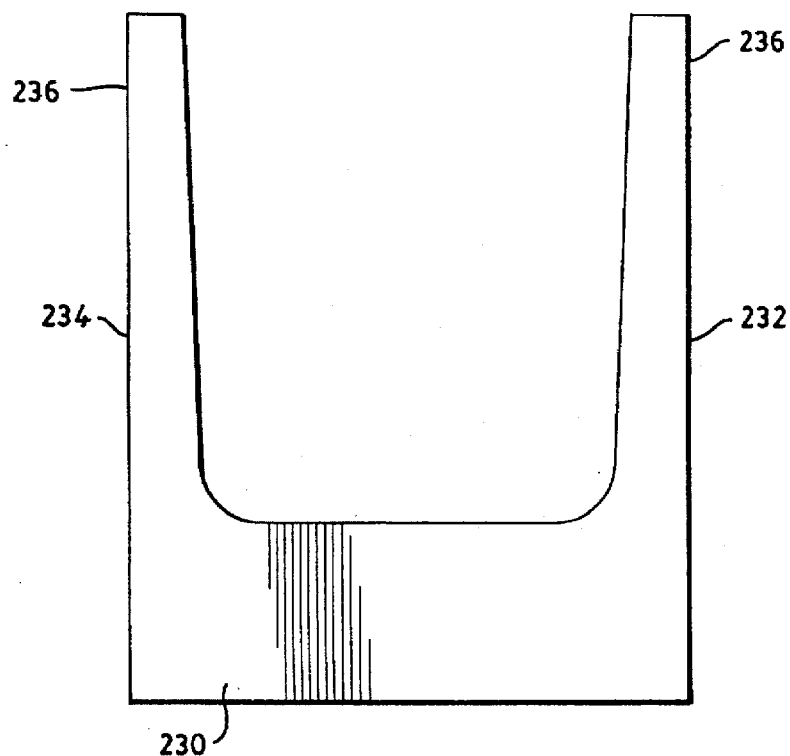
FIG. 7 is a front elevation view of a leaf spring component of the encoder assembly.
Figure 9:
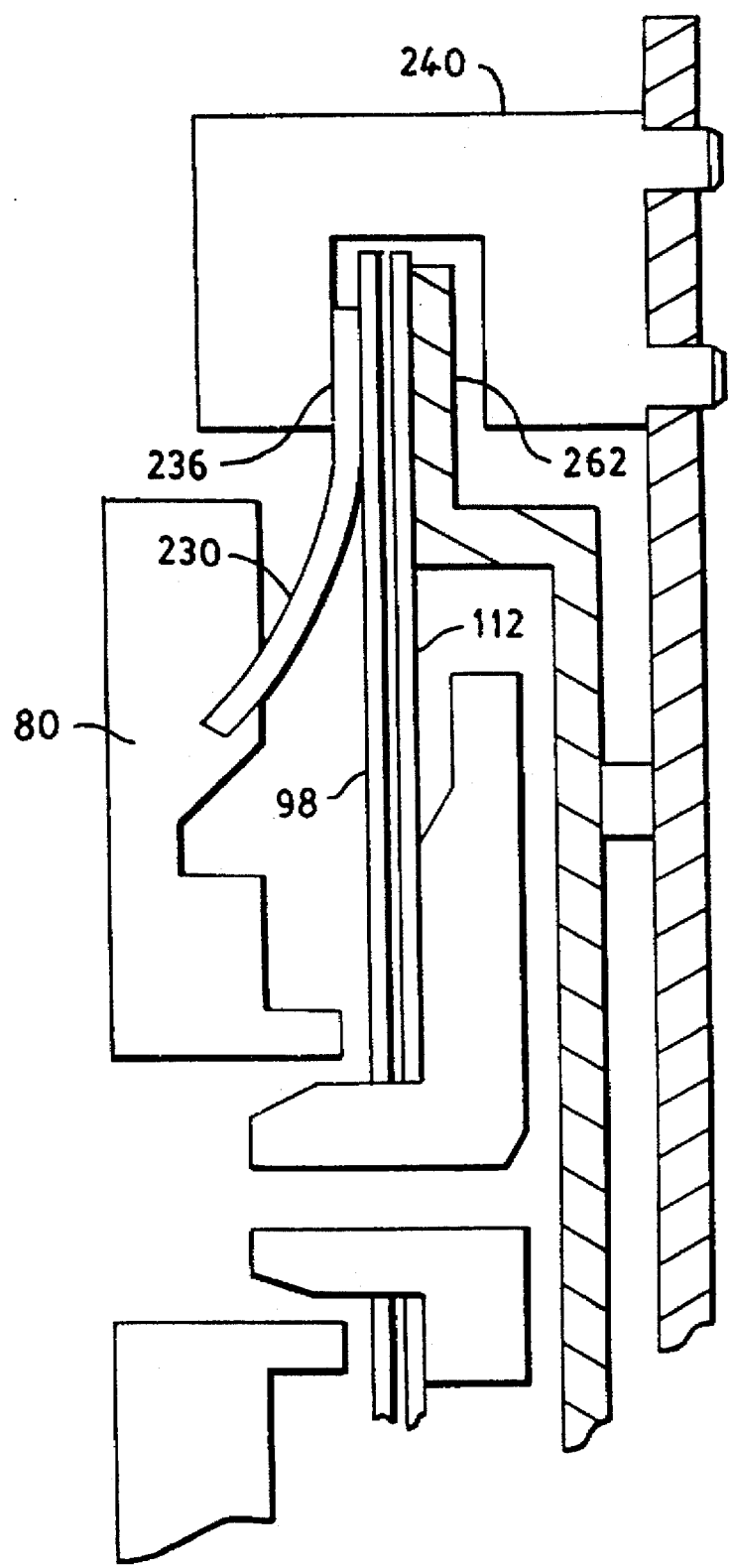
FIG. 9 is similar to FIG. 8, but shows, in addition, the leaf spring of FIG. 7 and support structure for the encoder assembly.

As shown in FIG. 9, the encoder assembly includes a leaf spring 230 having two leaves 232,234 (FIG. 7) connected together in a U-shape. Preferably, the spring 230 is of 0.003 inch thick stainless steel and is about 0.45×0.56 inch. The spring 230 biases the encoder mask 98 against the encoder sheet 112, and encoder sheet 112 against a flat platform member 262, so as to prevent the occurrence of air gaps between the mask 98 and sheet 112, and thereby prevent the scattering of light therebetween. In assembly, the spring 230 snaps into the front plate 80 and angles about 15° inwardly toward the encoder mask 98, such that end portions 236 of the spring leaves 232, 234 bear against the encoder mask surface. While a biasing means is being illustrated in connection with a preferred embodiment, such need not be the case. In this regard, the mask and sheet can also be urged into intimate relationship by virtue of a housing assembly.

Figure 6:
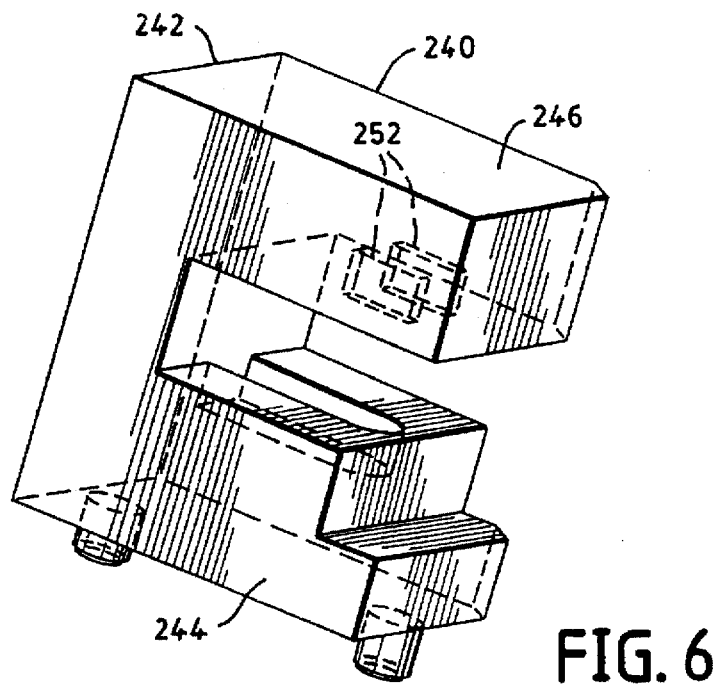
FIG. 6 is a perspective view of an interrupter component of the encoder assembly.
Figure 8:
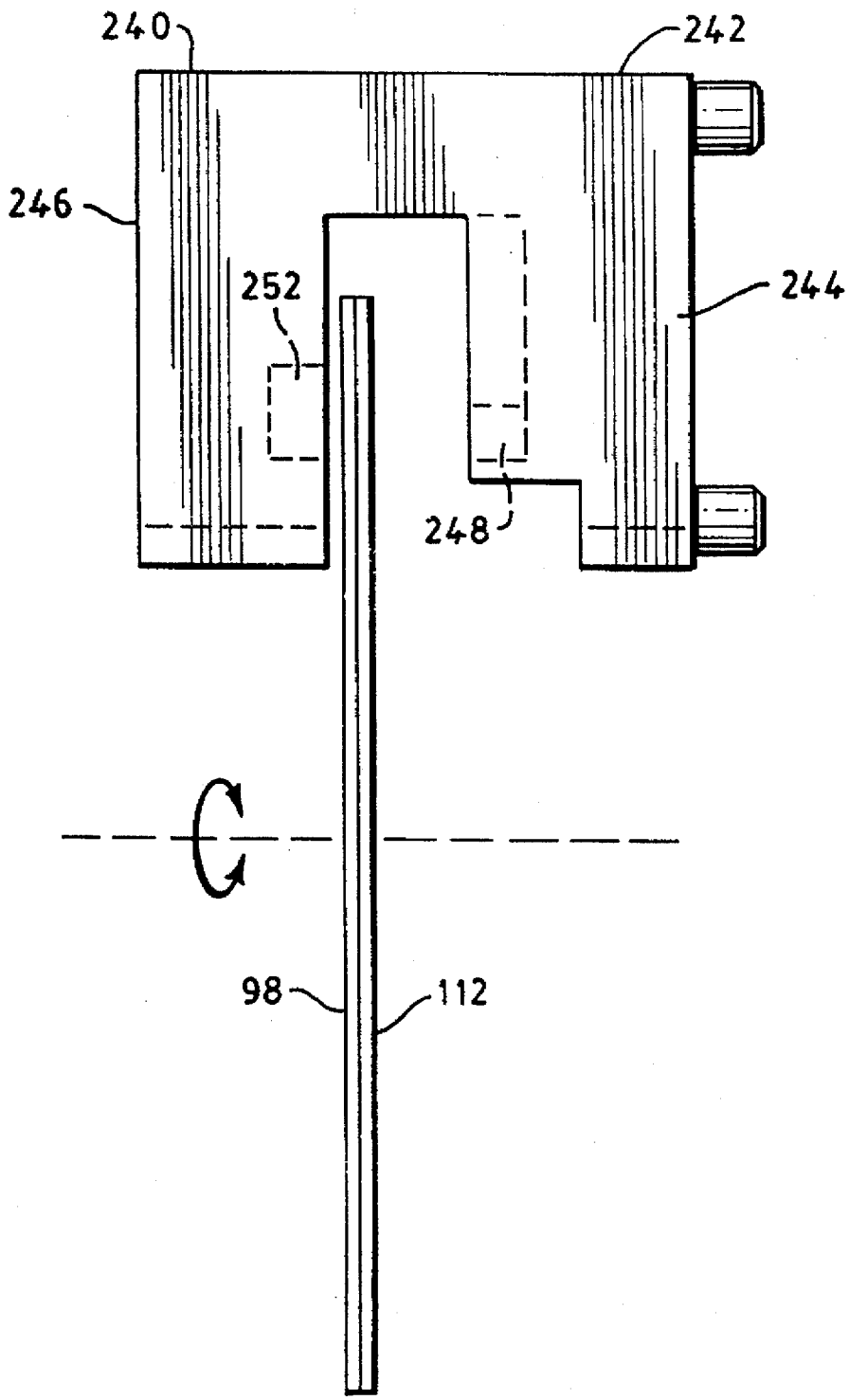
FIG. 8 is a side elevation view of the sheet of FIG. 5 and the mask of FIG. 4 shown in conjunction with the interrupter of FIG. 6.

The encoder assembly further includes a two channel optical coupled interrupter 240 (FIG. 6) adapted to emit and detect infrared light. The components of the interrupter 240 are disposed within a C-shaped housing 242. The housing 242 is C-shaped to permit the sheet and mask windows 118, 110 to rotate through the opening in the "C" (FIGS. 8 and 9). A first leg 244 of the C-shaped housing 242 houses an infrared light emitting diode 248. A second leg 246 of the C-shaped housing 242 houses two light detectors, such as phototransistors 252 (FIGS. 6 and 8). The phototransistors 252 determine both motor position and rotation direction, which corresponds to shutter blade position and movement direction, and to focus lens carrier position. The interrupter 240 is adapted to output low level electrical currents which correspond to the detected infrared light pulses.

Figure 10:
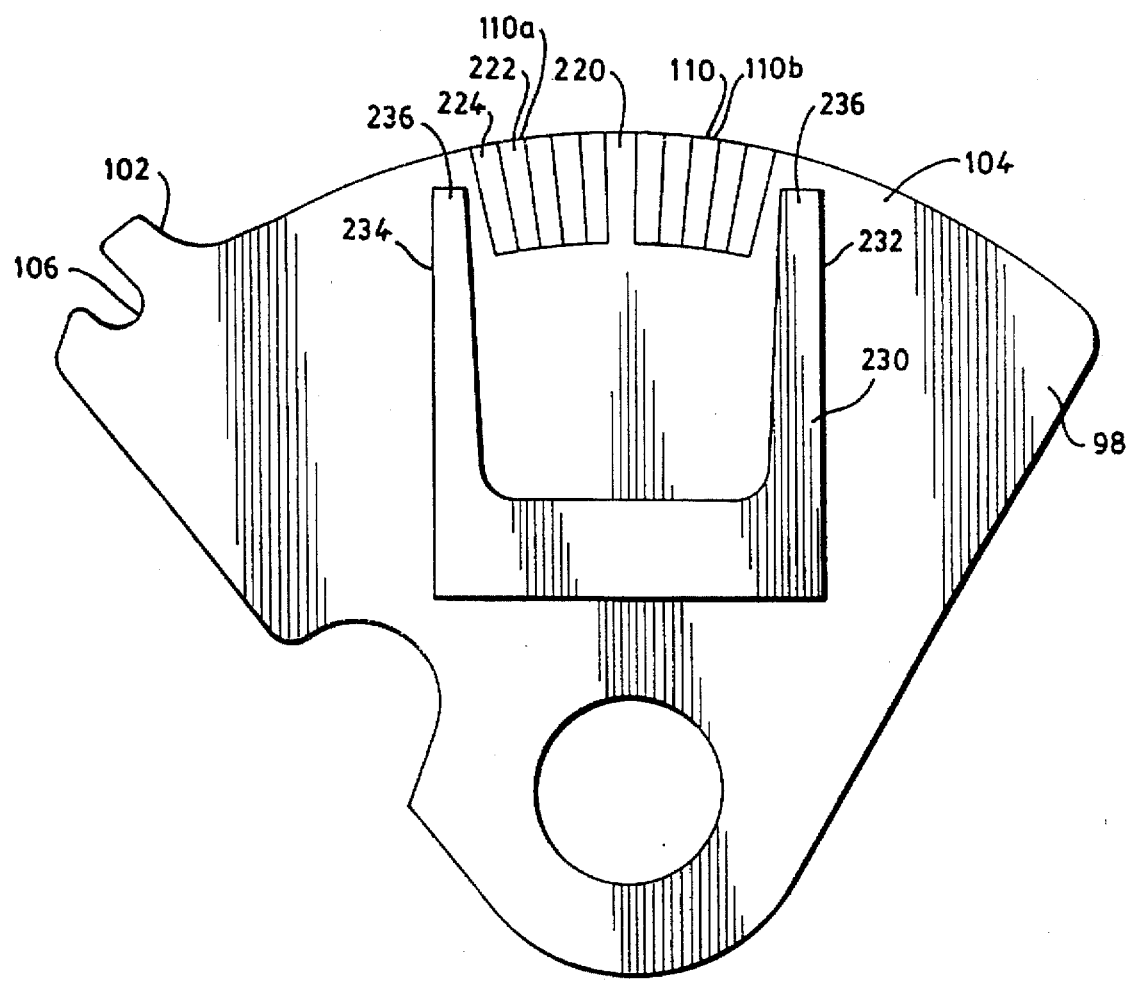
FIG. 10 is a front elevation view of the mask component of the encoder assembly, shown in conjunction with the leaf spring component.
Figure 11:
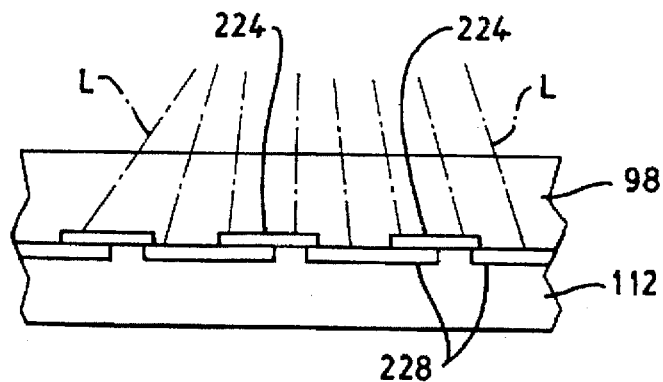
FIG. 11 is an enlarged diagrammatic view of the mask and sheet components in a preferred orientation.

The encoder assembly is assembled as a part of the shutter assembly shown in FIGS. 1A–1C. The encoder sheet 112 and mask 98 are mounted on the hub portion 124 of the beam actuator 122. The mask 98 is held stationary by the pin 107 extending from the rear surface 24 of the housing 20. The sheet 112 and the beam actuator 122 rotate together. The sheet 112 is rotated with the emulsion side of the sheet facing the emulsion side of the mask 98. The emulsion patterns of the mask and sheet 98, 112 are maintained in intimate sliding contact with one another, thereby permitting no air gap between the sheet and mask (FIG. 11). The leaf spring 230 is fixed to the shutter assembly structure, using a snap fit. The assembled spring position permits the two leaf spring leaves 232, 234 to bias inwardly toward the two window sections 110a, 110b (FIGS. 9 and 10), providing a force on two extreme sides of the mask window 110 to insure that the mask window pattern is in contact with the sheet pattern. Once the shutter assembly is assembled, there is an opening 250 (FIGS. 1C and 2) in the housing 20 where the sheet 112 and mask 98 patterns are exposed. The interrupter 240 is then assembled to the shutter housing in the opening 250, being placed such that the encoder sheet 112 and mask 98 are positioned in the c-shaped opening of the interrupter 240, with the encoder sheet 112 adjacent the platform member 262, as shown in FIG. 9, and spaced from the phototransistors 252 by about 0.015 inch.

In operation, the motor is activated to move the beam actuator 122 which, in turn, moves the shutter blades 40, 52, 66 and therewith, the encoder sheet 112, such that the encoder sheet markings 120 move past the encoder mask window 110. In addition, movement of the motor and beam actuator in an opposite direction causes actuator 122 to push the focus lens carrier 212, which causes the lens element portion 214 to move.

Figure 14:
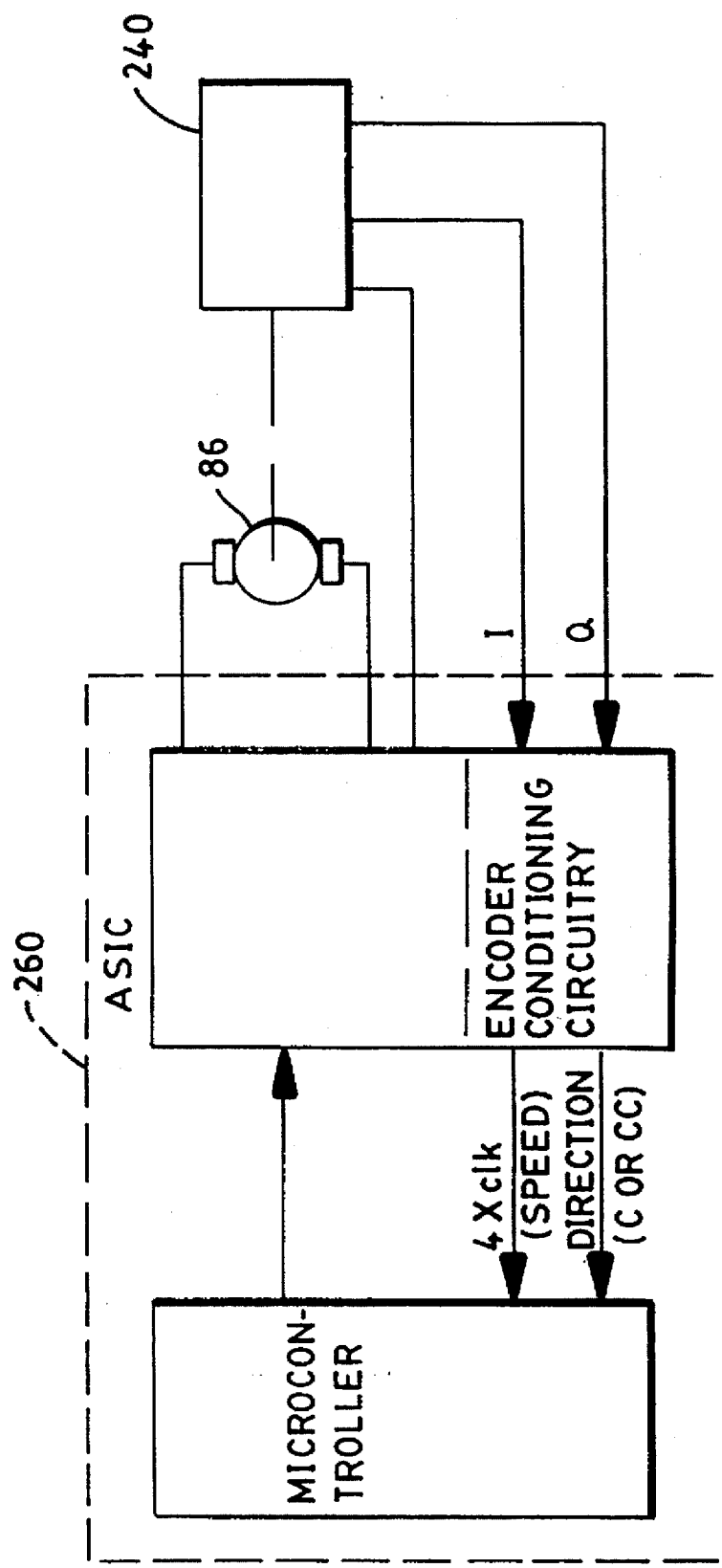
FIG. 14 is a diagrammatic representation of the encoder assembly interrupter in combination with a controller portion of the encoder assembly.

The phototransistors 252 in the interrupter second leg 246 read the transmission of light by the light emitting diodes 248 in the first leg 244 of the interrupter 240. The interrupter 240 provides a series of electrical signals to a controller 260 (FIG. 14). The controller 260 receives the signals from the interrupter 240 and interprets the signals as positional "counts". The counts are counted in relation to a zero-count "home" position of the shutter assembly. Rotation of the motor away from home is determined by the number of counts. The controller 260 then uses the "count" information to control the future position and direction of rotation of the motor 86.

The counts are generated by having the sheet window 118 pass concentrically over the mask window 110. This provides a number of light passage openings when each 20% light opening (transmissive band) in the sheet 112 passes over a 40% light opening in the mask 98. This occurs in both channel sections 110a, 110b of the mask 98. The light emitted is spaced about 0.02 inch from the mask window 110. The emitted light passes through the encoder mask transmissive bands and is detected by one of the two phototransistors located on the opposite side of the sheet and mask windows 118, 110. The interrupter then outputs electrical signals based upon the detection of light.

Figure 15C:
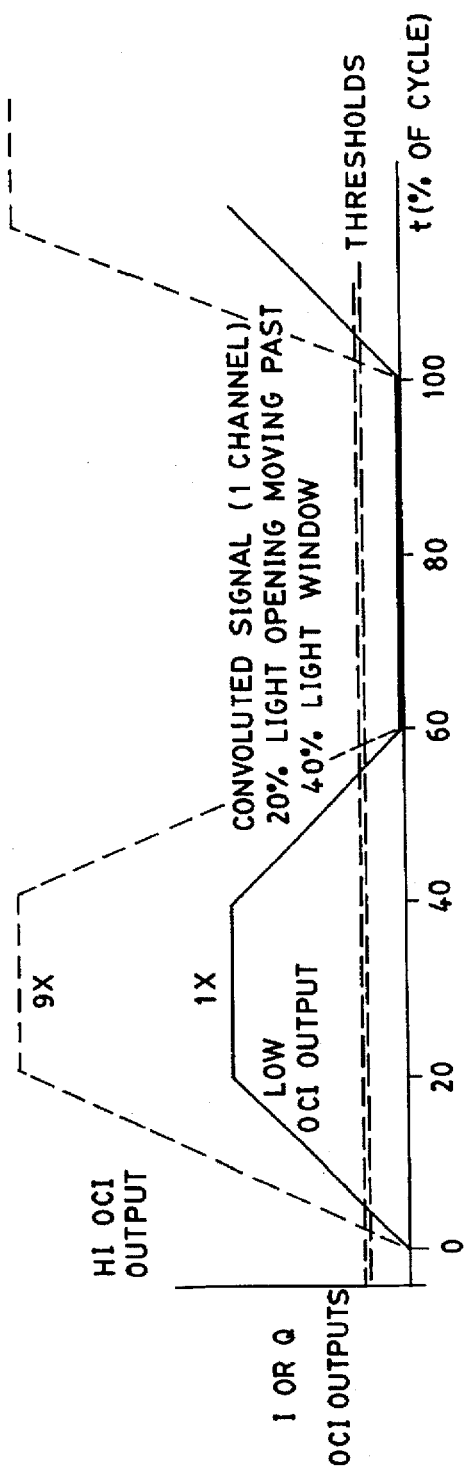

Referring to FIGS. 15A–15C, it will be seen that as the transmissive portion of a single duty cycle of the sheet, labeled "20% light on" in FIG. 15B, moves along the transmissive portion of a single duty cycle of the mask, labeled "40% light on" in FIG. 15A, maximum light detection builds for 20% of the time of one cycle, holds constant for 20% of the time of that one cycle, and decreases for 20% of the duty cycle time, followed by 40% of the duty cycle time in opaqueness. During the 20% of maximum light, the phototransistors 252 send a maximum strength signal (FIG. 15C) to the controller 260 (FIG. 14).

As noted above, the controller receives the electric signals from the interrupter and uses the signals to determine "counts" from which to determine position (4×) and direction of movement of the shutter blades.

The system is provided with an optical interrupter two channel output to monitor both motor position and direction. In the assembly shown in FIGS. 1A–1C, one motor 86 is used for focus, exposure and reset, with focus being accomplished with the motor turning in one direction, and exposure being accomplished with the motor turning in the other direction. Thus, information on motor direction is required to determine which operational phase is being conducted at a given time. The direction is monitored by having one encoder Channel 90° out of phase from the other channel. This is determined by the timing of light transmission of one mask section 110a relative to the other mask section 110b. The 90° offset permits a first channel to lead the other in electronic output in one direction, while in the other direction the second channel leads the first.

Figure 15D:
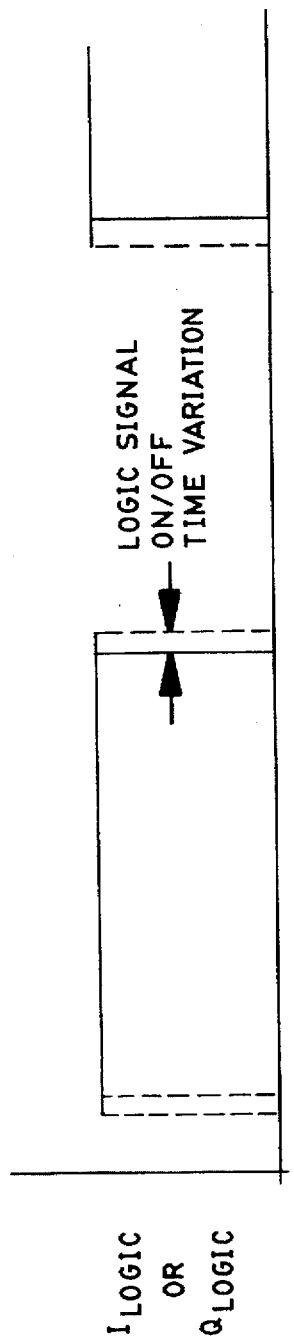

The encoder window bands on the sheet and mask provide a trapezoidal electronic waveform outputs (see FIG. 15C). Unlike 50%/50% encoder patterns that produce triangular electronic wave outputs, because of maximum light being detected at only one point, the patterns in the present encoder permit maximum light to be detected for a longer time, i.e., 20% of a cycle, as noted above. The trapezoidal wave output allows for substantial reduction in controller sensitivity to interrupter output. Aside from cost savings, and more importantly, the sheet and mask patterns described herein serve to desensitize the system and provide the best possible output results. This can be seen from the depiction in FIG. 15D. Signals I and Q, shown in FIG. 14, represent the analog signals from the Optical Coupled Interrupter (OCI) which then go to the encoder conditioning circuitry. As shown in FIG. 15C, the magnitude of these signals can vary from about 1× to 9×. The specific sheet and mask cycle times with the low threshold selected, ensure the least variation in logic signal on/off times as depicted in FIG. 15D.

After receiving the signals from the interrupter 240, the controller determines therefrom the position and direction of movement of the shutter blades and compares the position and direction of movement of the blades with the programmed blade position and direction of movement and, if necessary, directs the motor to change the speed and/or direction of rotation of the motor shaft.

Figure 12:
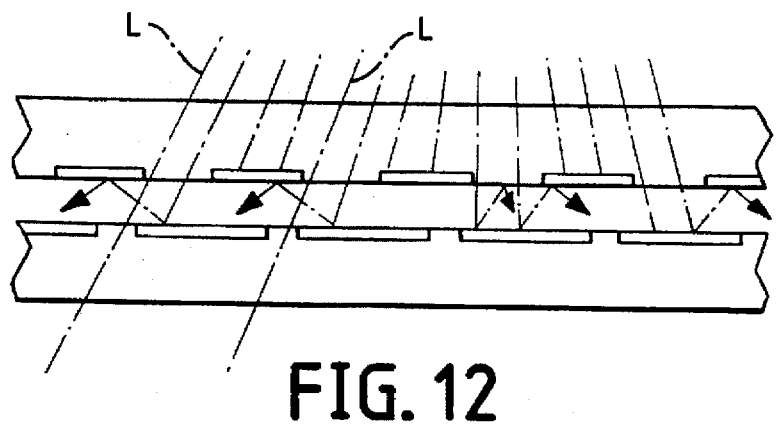
FIG. 12 is a diagrammatic view of mask and sheet components in a prior art orientation.
Figure 13:
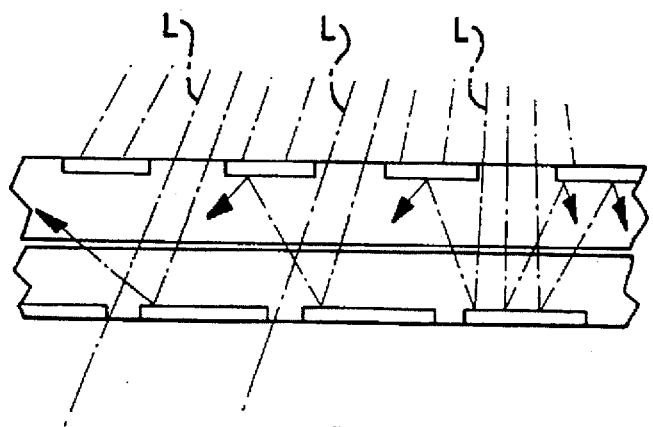
FIG. 13 is a diagrammatic view of an alternative prior art orientation of mask and sheet components.

In FIG. 11, there is illustrated a beneficial arrangement of having the emulsion sides of the mask 98 and sheet 112 pressed together, such that there is an emulsion side to emulsion side relationship. When the mask opaque portions 224 close the gaps between sheet opaque portions 228, virtually no light L enters between the mask and sheet. Accordingly, there is a substantial reduction or elimination of light scattering. On the other hand, if the mask and sheet are only loosely adjacent each other (FIG. 12), light L is able to shoot the gaps and enter between the mask and sheet, even when using the proportions of light and opaque portions suggested herein. Further, if the mask and sheet are held snugly adjacent each other, and the light and opaque proportions suggested herein are utilized, having the emulsion sides facing outwardly (FIG. 13), rather than inwardly toward each other, shooting the gaps between emulsions, or opaque portions, is permitted, allowing diffusion of unwanted light between the mask and sheet.

There is thus provided an encoder assembly having means for preventing or greatly reducing the diffusion of scattered light.

There is further provided an encoder assembly adapted to transmit a relatively elongated maximum signal to a controller, thereby reducing the required system sensitivity.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. An encoder assembly comprising: encoding mask means coupled to one of a pair of relatively movable members for providing alternating light blocking and unblocking portions; encoding sheet means coupled to a second one of the pair of relatively movable members for providing alternating light blocking and unblocking portions; means for urging said light blocking and unblocking means of said encoding mask and sheet means together into intimate abutting relationship with one another such scattering of light therebetween during relative movement of said movable members is significantly minimized or eliminated.

2. The assembly of claim 1 further including sensor means for passing pulses of light through said unblocking portions of said masking and sheet means from a first side when said unblocking portions are in registration with each other; and for detecting the pulses of passed light on a second side of said masking and sheet means, and for converting the passed light pulses to electrical signals, and for transmitting the electrical signals.

3. The assembly of claim 1 wherein said means for urging said masking and sheet means together comprises biasing means.

4. The assembly of claim 1 wherein said masking means is provided with an emulsion side and said sheet means is provided with an emulsion side, whereby said emulsion sides are facing each other; such that said urging means operates to urge said emulsion sides into intimate abutting relationship together.

5. The assembly of claim 1 wherein each area of said unblocking means of said sheet means is asymmetrical with respect to each respective area of said unblocking means of said mask means, whereby there is provided increased intervals at which a maximum amount of beam light is transmitted through said unblocking portions during movement of said mask means relative to said sheet means.

6. The assembly of claim 5 wherein each of said blocking portions of said mask means is of generally equal area with respect to each other; each of said unblocking areas of said mask means is of generally equal area; and, said combined areas of said blocking portions of said mask means is asymmetrical with respect to said combined areas of said unblocking portions.

7. The assembly of claim 6 wherein each one of said blocking portions of said sheet means is of generally equal area with respect to each other; each of said unblocking areas of said sheet means is of generally equal area to each other; and, said combined areas of said unblocking portions of said sheet means is asymmetrical with respect to said combined areas of said blocking portions.

8. The assembly of claim 7 wherein said unblocking portions of one of said sheet means or said mask means in total occupies about 40% of the area of said combined areas of said one sheet or mask means; and said unblocking means of the other of said sheet means or mask means occupies about 20% of said combined areas of said other sheet means or mask means.

9. The encoder assembly in accordance with claim 5 wherein said mask means includes first and second portions of alternating blocking and unblocking portions; wherein said first and second portions are separated from each other and out of phase with each other.

10. An encoder assembly for a camera shutter and lens focus assembly comprising a housing, a rotary motor mounted on the housing and having a central shaft, a rotary beam actuator connected to the shaft, and shutter blades and a focus lens carrier in mechanical communication with the beam actuator, wherein rotation of the shaft in a first direction by the motor operates to rotate the beam actuator to cause movement of the shutter blades to cause the shutter blades cooperatively to define an opening to permit light to pass therethrough in accordance with a preselected program, and rotation of the shaft in a second direction operates to rotate the beam actuator to cause movement of the focus lens carrier to position the focus lens carrier in accordance with a preselected program, the encoder assembly comprising:

- an encoder mask fixed in the housing and having an arcuate window having alternating opaque and transmissive radial portions therein, the area of said opaque portions exceeding the area of said transmissive portions;
- an encoder sheet rotatably mounted in the housing and disposed adjacent said encoder mask, said encoder sheet having an arcuate window having alternating opaque and transmissive radial portions therein, the area of said sheet opaque portions exceeding the area of said sheet transmissive portions;
- sensor means for passing light pulses from a first side of said mask and said sheet through said windows when a mask window transmissive portion is in registration with a sheet window transmissive portion, and for detecting the passed light pulses on a second side of said mask and said sheet, and for converting the passed light pulses to electrical signals, and for transmitting the electrical signals; and
- a controller for receiving the electrical signals from said sensor means and for determining therefrom the position and direction of movement of the shutter blades and the position of the focus lens carrier, and for comparing the shutter blade position and direction of movement with the preselected program, and for comparing the focus lens carrier position with a preselected program, and for sending to said motor a signal instructing any required compensating motor shaft movement change, and thereby shutter blade movement change, and focus lens carrier change.

11. An encoder assembly comprising: encoding mask means coupled to one of a pair of relatively movable members for providing alternating light blocking and unblocking portions; encoding sheet means coupled to a second one of the pair of relatively movable members for providing alternating light blocking and unblocking portions; sensor means for passing pulses of light through said unblocking portions of said masking and sheet means from a first side when said unblocking portions are in registration with each other; and for detecting the pulses of passed light on a second side of said masking and sheet means, and for converting the passed light pulses to electrical signals and for transmitting the electrical signals; each area of said unblocking means of said sheet means is asymmetrical in area from each area of said unblocking means of said mask means as said unblocking means of said sheet means moves relative to said unblocking means of said mask means for providing for increased intervals at which the maximum amount of beam light is transmitted through the unblocking portions and is read by sensing means.

12. The assembly of claim 11 wherein each of said blocking portions of said mask means is of generally equal area with respect to each other; each of said unblocking areas of said mask means is of generally equal area with respect to each other; and, to the combined areas of said blocking portions of said mask means is asymmetrical with respect to the combined areas of said unblocking portions.

13. The assembly of claim 12 wherein each one of said blocking portions of said sheet means is of generally equal area with respect to each other; each of said unblocking areas of said sheet means is of generally equal area to each other; and, the combined areas of said unblocking portions of said sheet means is asymmetrical with respect to the combined areas of said blocking portions.

14. The assembly of claim 13 wherein said unblocking portions of one of said sheet means or said mask means in total occupies about 40% of the area of said combined areas of said one sheet or mask means; and said unblocking means of the other of said sheet means or mask means occupies about 20% of said combined areas of the other of said sheet means or said mask means.

15. The assembly of claim 11 wherein said mask means includes first and second portions of alternating blocking and unblocking portions; wherein said first and second portions are separated from each other and out of phase with each other.

16. An encoder assembly for a camera shutter and lens focus assembly comprising a housing, a rotary motor mounted on the housing and having a central shaft, a rotary beam actuator connected to the shaft, and shutter blades and a focus lens carrier in mechanical communication with the beam actuator, wherein rotation of the shaft in a first direction by the motor operates to rotate the beam actuator to cause movement of the shutter blades to cause the shutter blades cooperatively to define an opening to permit light to pass therethrough in accordance with a preselected program, and rotation of the shaft in a second direction operates to rotate the beam actuator to cause movement of the focus lens carrier to position the focus lens carrier in accordance with a preselected program, the encoder assembly comprising:

- an encoder mask fixed in the housing and having an arcuate window having alternating opaque and transmissive radial portions therein, the area of said opaque portions exceeding the area of said transmissive portions;
- an encoder sheet rotatably mounted in the housing and disposed adjacent said encoder mask, said encoder sheet having an arcuate window having alternating opaque and transmissive radial portions therein, the area of said sheet opaque portions exceeding the area of said sheet transmissive portions;
- sensor means for passing light pulses from a first side of said mask and said sheet through said windows when a mask window transmissive portion is in registration with a sheet window transmissive portion, and for detecting the passed light pulses on a second side of said mask and said sheet, and for converting the passed light pulses to electrical signals, and for transmitting the electrical signals; and
- a controller for receiving the electrical signals from said sensor means and for determining therefrom the position and direction of movement of the shutter blades and the position of the focus lens carrier, and for comparing the shutter blade position and direction of movement with the preselected program, and for comparing the focus lens carrier position with a preselected program, and for sending to said motor a signal instructing any required compensating motor shaft movement change, and thereby shutter blade movement change, and focus lens carrier change.

* * * * *